(12) United States Patent
Proctor

(10) Patent No.: US 6,396,218 B1
(45) Date of Patent: May 28, 2002

(54) MULTISEGMENT ELECTROLUMINESCENT SOURCE FOR A SCANNER

(75) Inventor: Douglas E. Proctor, Gates, NY (US)

(73) Assignee: Xerox Corporation, Stamford, CT (US)

( * ) Notice: Subject to any disclaimer, the term of this patent is extended or adjusted under 35 U.S.C. 154(b) by 2 days.

(21) Appl. No.: 09/677,613

(22) Filed: Oct. 3, 2000

(51) Int. Cl.[7] .................................................. G09G 3/10
(52) U.S. Cl. ...................... 315/169.3; 313/581; 345/76; 345/82
(58) Field of Search ........................... 315/169.1, 169.2, 315/169.3; 313/581, 585; 345/36, 47, 76, 80, 82

(56) References Cited

U.S. PATENT DOCUMENTS

| | | | |
|---|---|---|---|
| 4,935,671 A | * 6/1990 | Harada et al. ............ | 315/169.3 |
| 5,525,866 A | 6/1996 | Mueller et al. ............ | 315/169.3 |
| 5,598,067 A | 1/1997 | Vincent et al. ............ | 315/169.3 |
| 5,818,174 A | * 10/1998 | Ohara et al. ............ | 315/169.3 |
| 5,986,628 A | * 11/1999 | Tuenge et al. ............ | 315/169.3 |
| 6,064,158 A | * 5/2000 | Kishita et al. ............ | 315/169.3 |
| 6,339,289 B1 | * 1/2002 | Fork ............................ | 313/506 |

* cited by examiner

*Primary Examiner*—Don Wong
*Assistant Examiner*—Jimmy T. Vu
(74) *Attorney, Agent, or Firm*—L. Robb

(57) ABSTRACT

An electroluminescent device used as an illumination source in a scanner, including a plurality of electroluminescent elements, each having a transparent electrode with a top surface, a radiation generating stack under the transparent electrode, and a second electrode under said radiation generating stack. A voltage source having a plurality of phase characteristics is coupled across the electrodes of each of the electroluminescent elements to apply a voltage to each of the electroluminescent elements.

6 Claims, 4 Drawing Sheets

MULTISEGMENT ELECTROLUMINESCENT SOURCE FOR A SCANNER

BACKGROUND OF THE INVENTION

The present invention relates generally to electroluminescent devices and more particularly to use of an electroluminescent device as a document illumination source for an image input scanner.

An image input scanner is an apparatus, which is used in facsimile or copy machine or the like to scan the image of an original such as a document. The document scanner ordinarily employs a light source, an image sensor array, and an optical system for forming an image of an original on the image sensor. In use, a document on an opaque substrate is placed with the surface containing the original facing down on a flat transparent reference surface, typically glass. The original document is fixed on the surface, such that a single line of the original, hereinafter referred to as a "scan line", is illuminated from below. The light reflected from the scan line is directed through an optical system to form an image of the scan line on a sensor such as a CCD array. The CCD array converts the optical signal to an electronic representation of the scan line, comprising a line of digital picture elements, or "pixels". The desired portion of the original is scanned, one scan line at a time, by moving the original relative to the illumination system, optical system, and sensor along a direction hereinafter referred to as the "scanning axis". In some systems, the illumination system, optical system and sensor are configured to move together as a unit. In other systems, the original is moved while the illumination system, optical system and sensor remain fixed.

For a number of years, a preferred light source for scanning documents has been the fluorescent lamp. A fluorescent lamp has electrodes at each end of a tube containing a noble gas, such as argon. A large potential difference applied between the two electrodes at the ends of the lamp generates an electric field within the tube. Electrons emitted from the negative electrode collide with mercury and noble gas atoms as they accelerate toward the positive electrode. Collisions with noble gas atoms result in the electron traversing a zig-zag path toward the positive electrode, thus greatly increasing the probability of collision with a mercury atom. Electron collisions with mercury atoms result in excitation or ionization of the mercury atom; when the excited mercury atoms relax to their normal energy state, ultraviolet radiation is generated. The tube is coated by phosphors, which transform the incident ultraviolet radiation to visible light. Fluorescent lamps are desirable to use as a light source because they are energy efficient and operate at a low temperature. However, the fluorescent lamp is an inherently unstable light source. It is an arc lamp with light output highly dependent on the localized temperature dynamics of the arc, the noble gas and the vaporized mercury. Consequently, the light intensity from the lamp varies both spatially and temporally along the length of the lamp. Such variation degrades the quality of scanned images. To address this shortcoming, fluorescent lamps are commonly warmed prior to use, such that the heat generated from the arc has minimal impact on spatial uniformity and temporal stability. This adds mass and complexity to an already bulky illumination system, which may require the addition of shielding to protect the scanner sensor from heat and stray light.

These problems are intensified in a color scanner, which typically requires broadband illumination over three spectral ranges in order to accurately reproduce an image of the original. Fluorescent lamps are commonly broadband sources, however the phosphors are generally selected to irradiate in the red, green or blue region of the visible spectrum. While it is possible to mix all three into a single blend, the phosphors age at different rates, which results in varying color fidelity of the scanner as the lamp ages.

In one prior art embodiment of the color scanner, three different broadband illuminators are sequentially shown onto a color. Reflections from each illuminator are measured to reconstruct the color of the area. In another prior art embodiment, the three lamps are placed into an optical system such that they simultaneously illuminate a common scan line on an object, with the reflected light measured by a sensor. These systems tend to be substantially larger, wasteful and more complicated than a single lamp approach. In addition, stray light and heat problems increase threefold.

In other color scanners, a single "white light" fluorescent lamp is the illumination source. In these devices, the reflected beam is split into different paths to be measured by sensors that are sensitive to different colors. The difference in spectral sensitivity may be achieved by placing color filters over the same type of sensors. This method again incurs the weaknesses of a fluorescent lamp.

One solution to these weaknesses is presented in U.S. Pat. No. 5,525,866 to Mueller, et al., which discloses an edge-emitting electroluminescent device for illumination in a scanner. An electroluminescent device provides a broadband, directional, solid-state source that is stable, spatially and temporally uniform, rugged, efficient, compact, requires a minimal warm-up period and may be single or multi-colored. In Mueller et al., the device is fabricated such that light is emitted from an edge of the device in narrow lines, rather than from the device surface. However, a narrow line source may have limitations for scanner use. Typically, the medium scanned is planar; as light shines onto the planar medium, diffused light will be reflected and measured by a sensor. However, in many situations, the medium scanned may have a curved surface, such as bound printed subject matter close to the cusp of two adjacent pages. Due to the curvature of the medium, the light may impinge on a position in the curvature quite different from the desired planar position, thus reducing the amount of reflected diffused light reaching the sensor. One approach to resolving this problem is to increase the power of the source and to widen the beam-width of the radiation through optics. However, this will increase the complexity and cost of the scanner.

Another solution is presented in U.S. Pat. No. 5,598,067 to Vincent, et al., which discloses a surface-emitting electroluminescent device for illumination in a scanner. In the device of Vincent, et al., the device is fabricated such that it emits light that is both spatially and temporally homogeneous from a surface rather than an edge. Multiple such elements may be combined into groups, with the radiation of the elements from each group centering around a frequency that is different from those of the other groups. The elements may be electronically controlled so that elements from each group emit radiation together, and the emission from each group is done in a sequential manner. Alternatively, all the elements emit together, to produce a desired spectral power distribution. However, electroluminescent devices are a pulsed light source. If the integration time of the image sensor is short compared to the duration of the light pulse, portions of the original will be scanned under conditions of relatively low illumination, degrading the accuracy of the scanned images.

Accordingly, the present invention satisfies the need for a broadband illumination source that is spatially and temporally uniform over the integration time of the image sensor in a scanner.

BRIEF SUMMARY OF THE INVENTION

An electroluminescent device used as an illuminating source in a scanner, including a plurality of electroluminescent elements, each having a transparent electrode with a top surface, a radiation generating stack under the transparent electrode, and a second electrode under the radiation generating stack. A voltage source having a plurality of phase characteristics is coupled across the electrodes of each of the electroluminescent elements to apply a voltage to each of the elements.

BRIEF DESCRIPTION OF THE DRAWINGS

The foregoing and other features of the instant invention will be apparent and easily understood from a further reading of the specification, claims, and by reference to the accompanying drawings in which:

All references cited in this specification, and their references, are incorporated by reference herein where appropriate for teaching additional or alternative details, features, and/or technical background.

While the present invention will be described hereinafter in connection with a preferred embodiment thereof, it should be understood that it is not intended to limit the invention to that embodiment. On the contrary, it is intended to cover all alternatives, modifications and equivalents as may be included within the spirit and scope of the invention as defined in the appended claims.

DETAILED DESCRIPTION OF THE INVENTION

One solution to the need for a broadband illumination source that is spatially and temporally uniform over the integration time of the image sensor in a scanner is the electroluminescent lamp of the instant invention. Electroluminescent lamps offer several advantages over fluorescent lamps. Because such a lamp can be made of a thin-film stack on a glass or ceramic substrate, the electroluminescent element is very rugged. Light generated through electroluminescence is very stable, with practically no non-uniform temperature or warm-up period. Additionally, the light generated and emitted from the top surface of an electroluminescent element is substantially uniform or homogeneous both spatially and temporally because of the uniformity of the thin-film process in making the element. While prior art fluorescent lamps are bulky and cylindrical in shape, radiating light and heat in many directions, which requires thermal isolation, electroluminescent lamps are directional.

Figure 1:
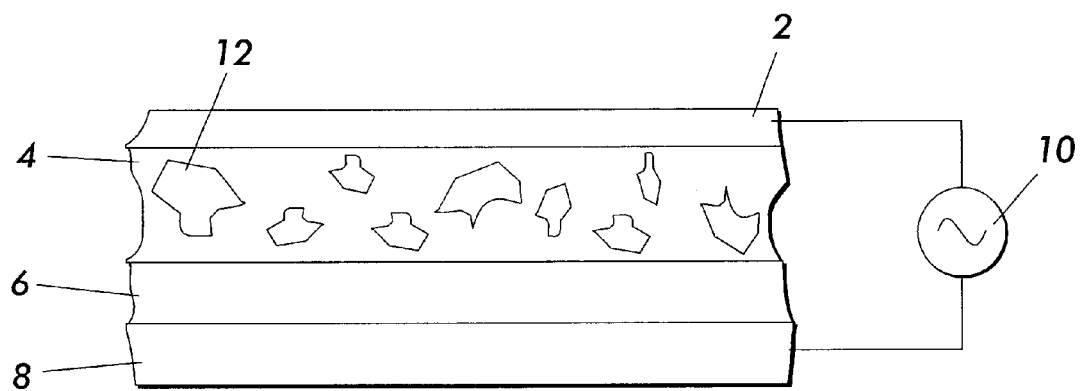
FIG. 1 is a cross sectional side view of an electroluminescent element.

Generally, electroluminescence is a solid-state phenomenon that uses phosphors, not heat, to generate light. Referring to FIG. 1, an electroluminescent lamp is electrically similar to a capacitor and consists of a dielectric layer 6 and a light-emitting phosphor layer 4 sandwiched between two conductive surfaces 2 and 8. The luminescent material 12 is commonly dispersed within the phosphor layer, which may be in any location in the path of the electrostatic field. The primary purpose of the dielectric layer is to allow the lamp to withstand higher voltages without shorting between the conductive surfaces. Electroluminescent lamps illuminate when powered with alternating current (AC). As voltage 10 is applied to the conductive surfaces, an electric field is generated across the phosphor and the dielectric layers. Twice during each cycle electrons are excited from the valence band into the conduction band. Many of these excited electrons emit light through the transparent front electrode as they return to their ground state.

Figure 2:
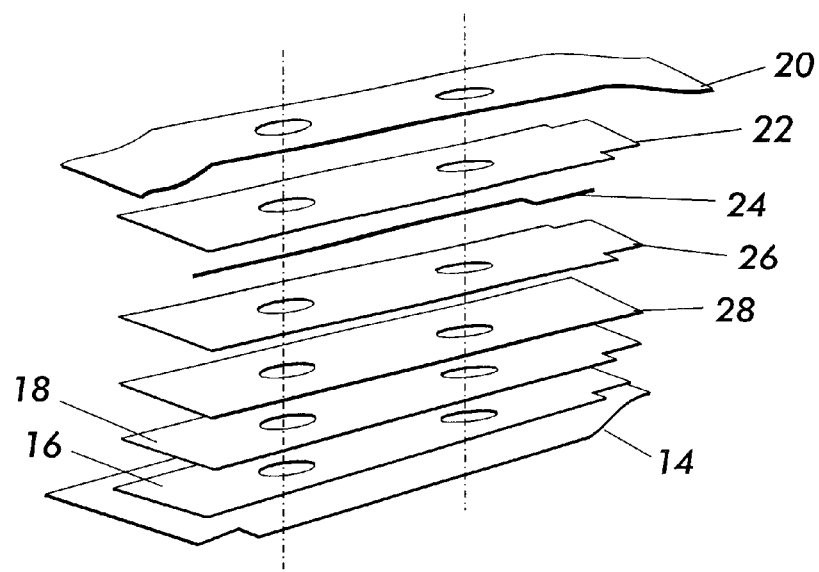
FIG. 2 is an exploded view of an electroluminescent element.

Of course, alternate constructions of an electroluminescent lamp are possible, as illustrated in FIG. 2. This construction consists of top and bottom layers 20 and 14, which encapsulate the lamp to protect it from exposure to the environment, especially moisture, and provide electrical insulation. A dielectric layer 18 and phosphor layer 28 are sandwiched between conductive surfaces 16 and 26, with surface 26 acting as a transparent electrode. Above transparent electrode 26 is bus bar 24, which provides a more uniform electric field across the entire lamp surface, insuring more uniform luminance. A moisture-absorbing dessicant layer 22 is laminated between bus bar 24 and top layer 20. As is appreciated by one skilled in the art, numerous possible electroluminescent lamp constructions are possible, including the stacking of electroluminescent elements. All such constructions are considered to be within the spirit and scope of the instant invention as limited by the appended claims.

Figure 3:
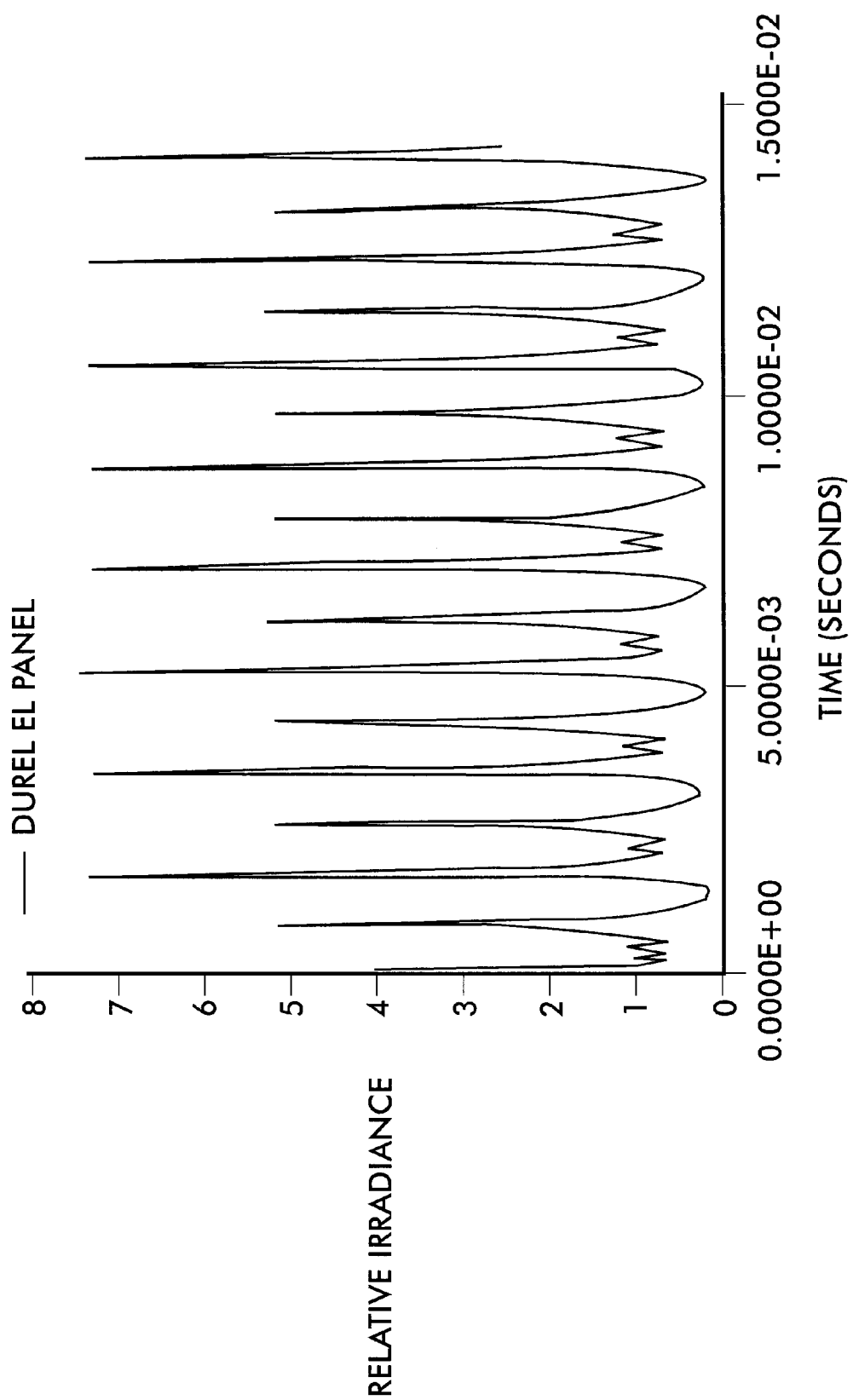
FIG. 3 is a graph of the integrated irradiance from a single electroluminescent element.

Electroluminescent lamps emit light pulses at twice the frequency of the applied AC potential. On 60 Hz power the lamp pulses 120 times per second. This characteristic is basic to all electroluminescent phosphors. In addition, depending on the phosphor, the pulses may be divided into primary and secondary components, so that each pulse contains two peaks of unequal amplitude, as illustrated in FIG. 3. Depending on the phosphor and the frequency, there usually is a continuous component due to phosphorescent decay, because the emission from one-half cycle fails to reach zero prior to the next half cycle. This continuous component is commonly about 20% of the emission, but varies widely in accordance with the intrinsic decay rate of the particular phosphor.

Figure 4:
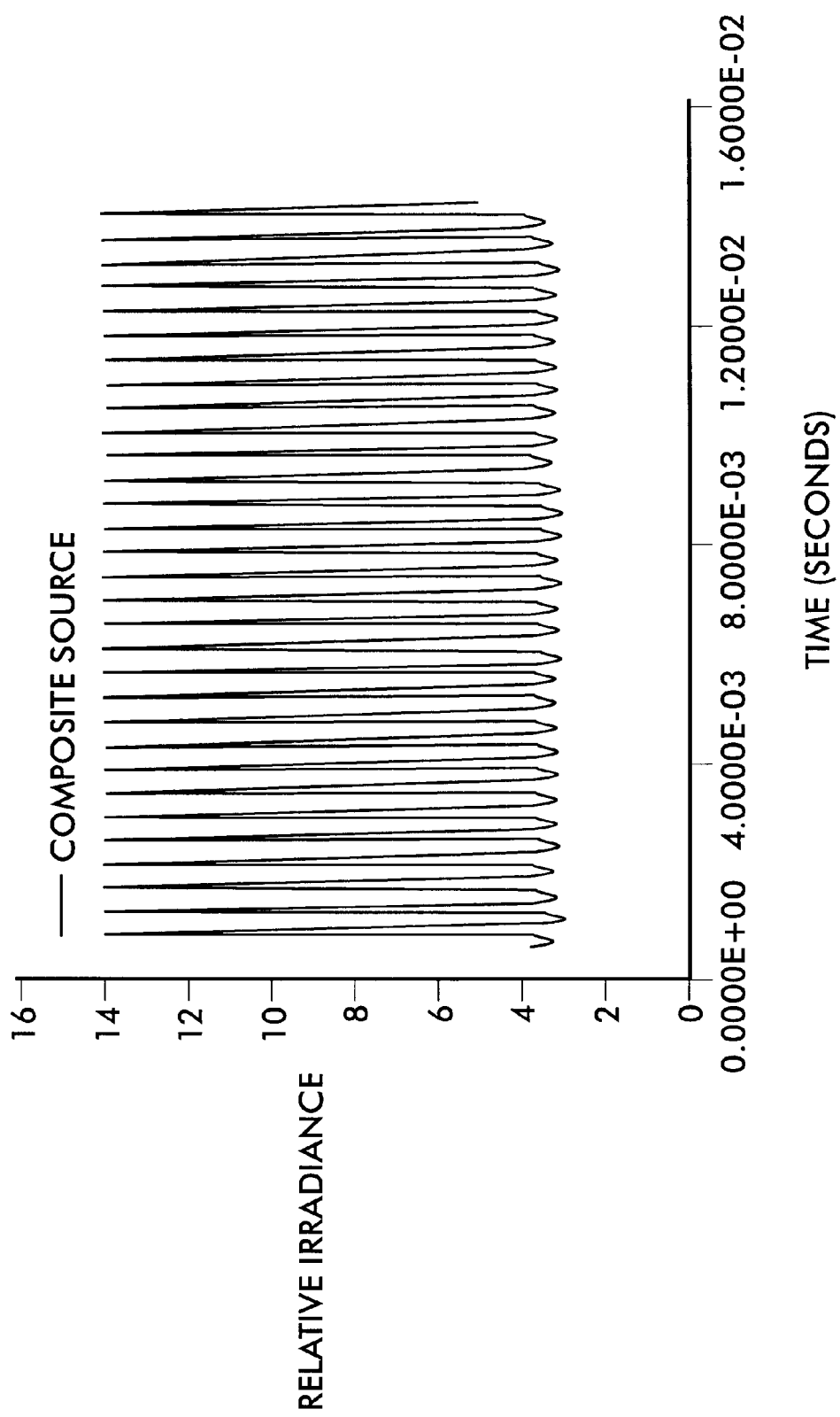
FIG. 4 is a graph of the convolved integrated irradiance from a four segment electroluminescent lamp.

Because of the pulsed nature of their output coupled with their historically low radiance, electroluminescent lamps have generally been disregarded for use as exposure lamps in scanners and copiers. With advances in sensor technology, low radiance is no longer a prime concern. However, the pulsed output of electroluminescent elements remains an issue, since scanners and copiers require a constant illumination level on a scan line to scan line basis. In a scanner application utilizing a pulsed light source, if the integration time of the image sensor is short compared to the duration of the light pulse, portions of the original will be scanned under conditions of relatively low illumination. Referring now to FIG. 4, the instant invention addresses this issue by using multiple electroluminescent lamps with the applied voltage of each lamp being phase shifted relative to that of the adjacent electroluminescent lamp. The net frequency of the composite lamp is then high enough for a scanner image sensor operating at a reasonable integration time to integrate out the lamp ripple. For example, given a ten segment composite lamp operating at 1.5 kHz with each of the segments phase shifted by 36 degrees, the net frequency of the light pulses would be approximately 30 kHz, which would correspond to a sensor integration time of 33 μseconds. Alternatively, integration could occur over several pulses, with the scanner operating at proportionately slower speeds.

Figure 5A:
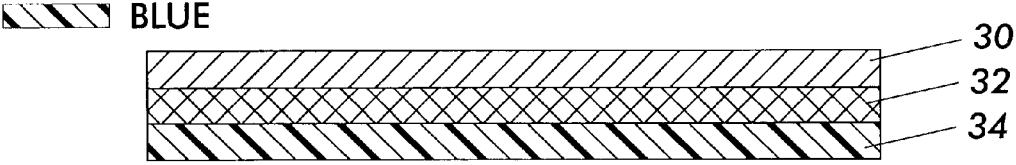
FIGS. 5A–5C illustrate preferred embodiments of the multi-segmented electroluminescent device for a scanner.
Figure 5B:
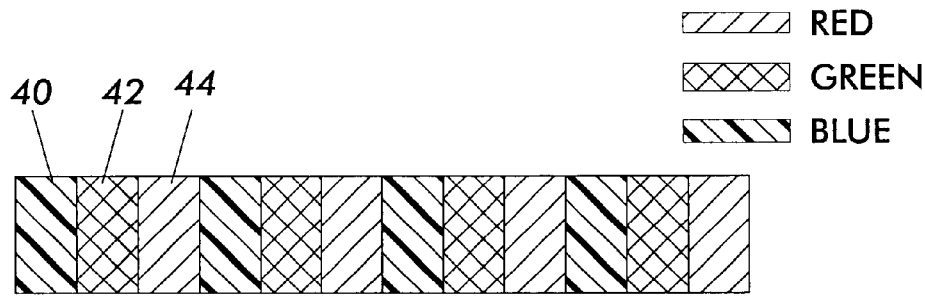
Figure 5C:
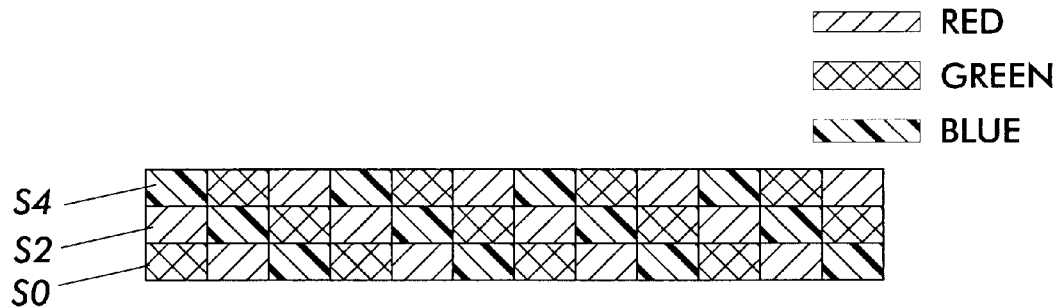

Embodiments of the multisegment light source of the instant invention are illustrated in FIGS. 5A–5C. In FIG. 5A the multisegment light source includes three electroluminescent lamps of differing colors to cover the visible spectrum. In this embodiment a single red lamp 30, a single green lamp 32, and a single blue lamp 34 extend parallel and adjacent to each other for the length of the scan line. The voltage applied to each lamp is phase shifted relative to that of the adjacent lamp. The multisegment lamp of FIG. 5B includes multiple blue (40), green (42), and red (44) electroluminescent lamps alternating perpendicularly along the length of the scan direction. The embodiment of FIG. 5C includes blue (54), red (52), and green (50) electroluminescent lamps alternating with each other in a checkerboard pattern extending the length and width of the scan line.

The differing colors of the various embodiments may be obtained in several ways. Although utilizing the intrinsic spectral emission characteristics of single electroluminescent phosphors is preferred, two or more phosphors may be combined in a blend, a phosphor may be used in conjunction with a photoluminescent dye, or a lamp may be combined with an overlay. Because current fabrication techniques for electroluminescent lamps involve the deposition of dielectric, phosphor and rear electrode conductive ink layers on a transparent front electrode, the number of segments possible in a composite lamp are limited only by the registration capabilities of the printing process.

It is therefore evident that there has been provided, in accordance with the present invention, an electroluminescent document illumination device for an image output scanner that fully satisfies the aims and advantages of the invention as hereinabove set forth. While the invention has been described in conjunction with a preferred embodiment thereof, it is evident that many alternatives, modifications, and variations may be apparent to those skilled in the art. Accordingly, it is intended to embrace all such alternatives, modifications, and variations which may fall within the spirit and scope of the appended claims.

What is claimed is:

1. An illumination apparatus for a scanning device, comprising:

a plurality of electroluminescent elements, each said element comprising a transparent electrode with a top surface, a radiation generating stack under said transparent electrode, and a second electrode under said radiation generating stack, said second electrode having a bottom surface, wherein a first one of said plurality of electroluminescent elements has a first light emitting characteristic that is different from a light emitting characteristic of a second one of said plurality of electroluminescent elements; and a voltage source having a plurality of phase characteristics coupled across said electrodes of each of said electroluminescent elements for applying a voltage to each of said electroluminescent elements, wherein said voltage source applies a voltage having a first phase characteristic to a first one of said plurality of electroluminescent elements and a voltage having a second phase characteristic to a second one of said plurality of electroluminescent elements, such that the frequency of light pulses emitted from both said first and said second electroluminescent elements exceeds the frequency of light pulses emitted from only the first said electroluminescent element.

2. The illumination apparatus according to claim 1, wherein said light emitting characteristics of said first and second electroluminescent elements comprise colors, whereby the color of said first electroluminescent element is different from the color of said second electroluminescent element.

3. The illumination apparatus according to claim 1, further comprising:

a plurality of a first group of electroluminescent elements, each being substantially identical to a first electroluminescent element;

a plurality of a second group of electroluminescent elements, each being substantially identical to the first group of electroluminescent elements, except the light emitting characteristic of the second group of electroluminescent elements is different from the light emitting characteristic of said first group of electroluminescent elements; and a plurality of a third group of electroluminescent elements, each being substantially identical to the first group of electroluminescent elements, except the light emitting characteristic of the third group of electroluminescent elements is different from the light emitting characteristic of the electroluminescent elements of said first group and the electroluminescent elements of said second group.

4. The illumination apparatus according to claim 3, wherein the electroluminescent elements are selected to be structurally arranged sequentially according to their corresponding group number, repeating with an element selected from the first group after an element from the third group has been selected.

5. The illumination apparatus according to claim 1, wherein most of the radiation generated from said radiation generating stack is emitted from said top surface.

6. The illumination apparatus according to claim 1, wherein most of the radiation generated from said radiation generating stack is emitted from said top and bottom surfaces.

* * * * *